(No Model.)

A. H. JOHNSON.
COMBINED CULTIVATOR AND COTTON CHOPPER.

No. 405,165. Patented June 11, 1889.

Witnesses.
E. P. Ellis
Allen S. Pattison

Inventor:
Andrew H. Johnson
per J. A. Lehmann,
atty.

UNITED STATES PATENT OFFICE.

ANDREW HENRY JOHNSON, OF TRYUS, MISSISSIPPI.

COMBINED CULTIVATOR AND COTTON-CHOPPER.

SPECIFICATION forming part of Letters Patent No. 405,165, dated June 11, 1889.

Application filed March 15, 1889. Serial No. 303,420. (No model.)

*To all whom it may concern:*

Be it known that I, ANDREW HENRY JOHNSON, of Tryus, in the county of Lawrence and State of Mississippi, have invented certain new and useful Improvements in a Combined Cultivator and Cotton-Chopper; and I do hereby declare the following to be a full, clear, and exact description of the invention, such as will enable others skilled in the art to which it pertains to make and use it, reference being had to the accompanying drawings, which form part of this specification.

My invention relates to an improvement in a combined cultivator and cotton-chopper; and it consists in the combination of the front supporting-wheel having cranks attached to its axle, connecting-rods extending therefrom, a mechanism located upon the top of the beam for imparting a rotary reciprocating motion to a shaft extending parallel with the beam, and a mechanism connected to the rear end of the beam for operating the hoe, all of which will be more fully described hereinafter.

The object of my invention is to attach to a cotton scraper or cultivator a mechanism by which a hoe is set in operation for the purpose of chopping out the cotton as the cultivator is moved along.

Figure 1:
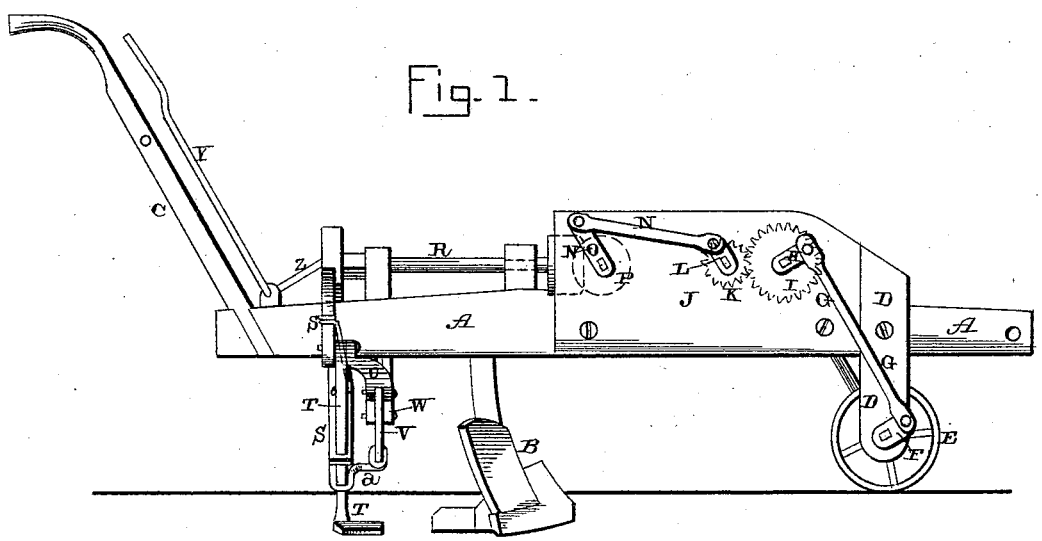
Figures 2, 4:
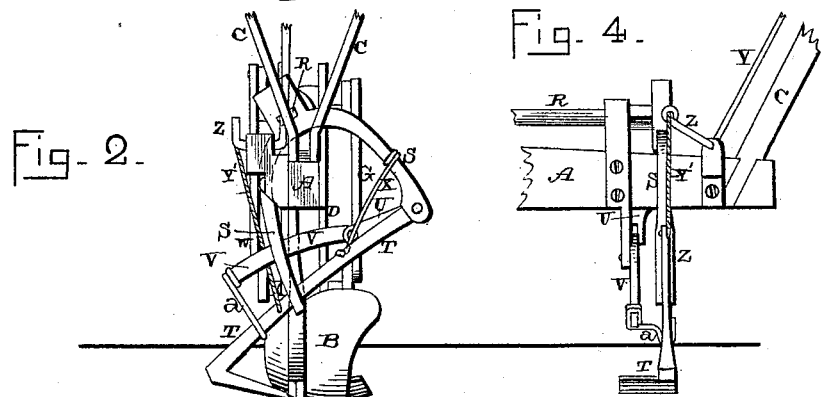
Figure 3:
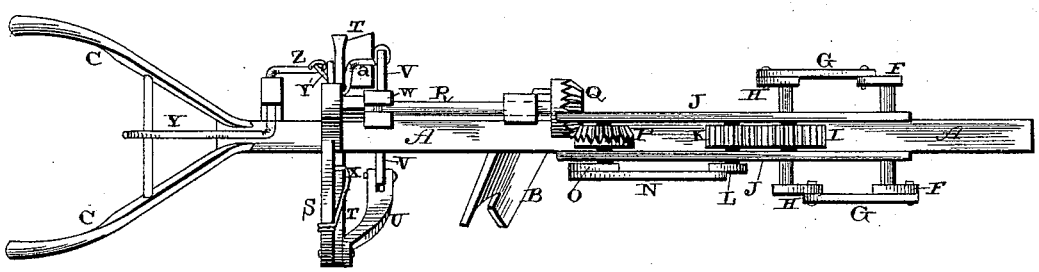

Figure 1 is a side elevation of a cultivator embodying my invention. Fig. 2 is a rear end view of the same. Fig. 3 is a plan view. Fig. 4 is a detail view.

A represents the beam, B the cotton scraper or cultivator, and C the handles attached to the rear end of the beam. Journaled between the lower ends of the hangers D, which are secured to the two opposite sides of the front end of the beam, is the wheel E, which is caused to revolve by frictional contact with the ground as the cultivator is moved along, and secured to opposite ends of the shaft to which the wheel is secured are the cranks F, which are set at any suitable angle to each other. Connected to the cranks F are the connecting-rods G, which have their upper ends connected to cranks H on each end of the spur-wheel I. The shaft of the wheel I is journaled in suitable bearings J, which are secured to opposite sides of the beam A, and which bearings are of any suitable length and height, as shown.

The spur-wheel I meshes with a pinion K, the shaft of which is also journaled in the bearings J, and to one end of this shaft is secured a crank L. To this crank is fastened a pitman N, which has its rear end attached to a second and longer crank O. The crank O is made longer than the one L, so that the continuous revolution of the crank L shall only impart a reciprocating motion to the crank O and to the beveled wheel P, which is secured to its shaft. Meshing with this wheel P is a second beveled wheel Q, secured to the front end of the shaft R, journaled in suitable bearings upon the top of the beam A. This shaft has a partially-rotating movement, which is received through its wheel Q from the one P. Secured to the rear end of the shaft R is a pronged supporting-frame S, the prongs of which are sufficiently long to project and operate upon the opposite sides of the beam. To one of the prongs is pivoted the handle T of the hoe, and this handle passes through a slot, which is made in the opposite prong of the support S. The hoe, as shown, projects any suitable distance beyond the slotted arm of the support. Pivoted to the same arm of the support as the one to which the end of the hoe-handle is attached is a connecting rod or lever U, which has its inner end pivoted to the lever V, pivoted in a support or bearing which extends down below the lower edge of the beam. This support or bearing W may be a part of one of the bearings in which the shaft R revolves. To the outer end of this lever V is secured a bent rod or hook $a$, which catches under the handle T of the hoe and raises the hoe upward after each stroke.

In order to force the hoe downward and to keep it in that position, when it is free to move, a spring X is secured to one prong of the support S, and this spring bears upon the top of the handle T, as shown. In order to raise the hoe when it is not desired that it shall operate, as when the first row is being cultivated, a cord, chain, or wire Y′ is fastened to the handle T, and the upper end of this cord or wire is fastened to the lower bent end Z of the lever Y, journaled or pivoted upon the top of the rear end of the beam. The upper end of this lever projects up in front of the handle C, where it can be readily grasped and held by the operator. When the hoe is allowed to operate, as the cultivator is drawn forward, it makes a cut so as to chop out the plants, and then is raised and makes another cut, after the machine is moved forward far enough. To the standard may be attached a cotton-scraper or a cultivator of any desired construction.

Having thus described my invention, I claim—

1. The combination of the beam having a cultivator or scraper secured thereto with the standards, the wheel journaled therein, the pitmen operated by the wheel, a gear-wheel provided with cranks and operated by the pitmen, a pinion which meshes with the wheel provided with a crank at one end of its shaft, a pitman N, a beveled gear-wheel provided with a crank upon its shaft, a beveled gear-wheel Q, the partially-rotating shaft R, the pronged support S, secured to the rear end of the shaft, the hoe connected to the support, and an operating-lever for raising the hoe, substantially as shown.

2. The combination, with the beam, an operating mechanism which is operated by or from the wheel E, the partially-rotating shaft R, journaled upon the beam, a pronged support secured to the rear end of the shaft, the handle T of the hoe, pivoted to one prong of the support and passing through a slot in the other, the pivoted lever V, the connecting-rod U, attached to the inner end of the lever, and a hook secured to the outer end of the lever for catching under the hoe-handle, and a lever Y Z, for raising the hoe above the ground, substantially as described.

In testimony whereof I affix my signature in presence of two witnesses.

ANDREW HENRY JOHNSON.

Witnesses:
    D. M. LEE,
    WILL C. CANNON.